United States Patent [19]
Munro

[11] 3,834,829
[45] Sept. 10, 1974

[54] TOOL HOLDER FOR INDEXABLE CUTTING INSERTS

[75] Inventor: Gerald Kirk Munro, Detroit, Mich.

[73] Assignee: Gorham Tool Company, Detroit, Mich.

[22] Filed: Aug. 20, 1973

[21] Appl. No.: 389,709

[52] U.S. Cl.................................. 408/179, 408/239
[51] Int. Cl........................................... B23b 29/034
[58] Field of Search ........... 408/157, 179, 182, 147, 408/153, 181, 185

[56] References Cited
UNITED STATES PATENTS

| | | | |
|---|---|---|---|
| 1,273,752 | 7/1918 | Ebert | 408/179 |
| 3,343,431 | 9/1967 | Boyer | 408/181 |

*Primary Examiner*—Gil Weidenfeld
*Attorney, Agent, or Firm*—Barnes, Kisselle, Raisch & Choate

[57] ABSTRACT

A tool holder having two diametrically opposed indexable cutting inserts mounted thereon. Each insert is retained on the holder in a pocket, the radially inner end wall of which is formed as a radially flexible blade. Two screws are associated with each insert, one for displacing the insert and flexing the blade radially inwardly and the other for flexing the blade and displacing the insert radially outwardly.

12 Claims, 5 Drawing Figures

PATENTED SEP 10 1974 3,834,829

TOOL HOLDER FOR INDEXABLE CUTTING INSERTS

This invention relates to tool holders for indexable cutting inserts and, more particularly, to a boring tool having means for radially adjusting inserts mounted thereon.

Rotary cutting tools with indexable carbide cutting inserts are commonly used for such operations as milling and boring. For extremely accurate machining or in order to produce uniform wear on a plurality of inserts mounted on the same holder it frequently becomes necessary to provide some sort of means for adjusting the inserts radially of the rotary axis of the tool. Such means for radially adjusting the inserts have been proposed heretofor but, generally speaking, they are either of relatively expensive construction or are not completely adequate from the functional standpoint.

The present invention has for its primary object the provision of a tool holder with means for radially adjusting cutting inserts thereon, which means are both economical and functionally adequate.

The invention generally contemplates a tool holder containing a pocket for the reception of an indexable cutting insert, the radially inner end of the pocket against which the radially inner anvil edge of the inserts abuts being formed as an axially extending, radially flexible blade with means for flexing the blade for enabling positioning of the insert in a radially precise location.

More specifically, the tool holder of this invention comprises a body having a shank and a head portion which is split lengthwise into two generally similarly shaped half sections adapted to be assembled in face-to-face relation with the parting face of each half section formed with a recess which, when the half sections are assembled, define pockets for the reception of indexable cutting inserts. Adjacent the radially inner end of each pocket and spaced radially therefrom each half section is provided with an axially extending slot so that the radially inner wall of each pocket is in the form of a radially flexible blade. The blade is adapted to be flexed radially outwardly and radially inwardly by two screws so that the insert in the pocket can be securely clamped in a precisely located radially adjustable position.

Other objects and features of the present invention will become apparent from the following description and accompanying drawing, in which.

Figure 3:
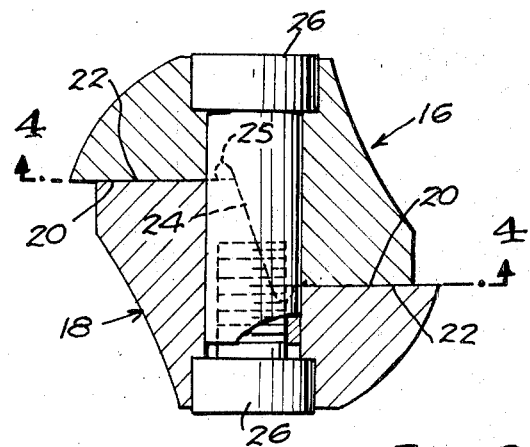
FIG. 3 is a sectional view along the line 3—3 in FIG. 1.

The holder of the present invention comprises an elongated body 10 having a cylindrical shank portion 12 and an enlarged head portion 14. The body 10 is split lengthwise into two half sections 16 and 18 of substantially identical shape, as seen in FIG. 3. The parting surfaces of sections 16 and 18 comprise axially extending generally flat faces 20, 22 and 24 which mate when the two half sections are assembled in the manner illustrated in FIG. 3. As shown in FIG. 3, parting faces 20,22 are radially offset from one another in parallel relation and parting face 24 on each half section is angularly inclined relative to the planes of the parallel flat faces 20,22. The intersection of parting faces 20,24 is defined by a rounded groove 25. The two half sections 16 and 18 are adapted to be clamped together by screws 26 extending through registering openings 28 in the two half sections of the holder. The shank portion 12 of either or both half sections is formed with one or more flats 30 for locking the tool holder in the socket of a machine tool spindle as by screws (not illustrated).

Figure 1:
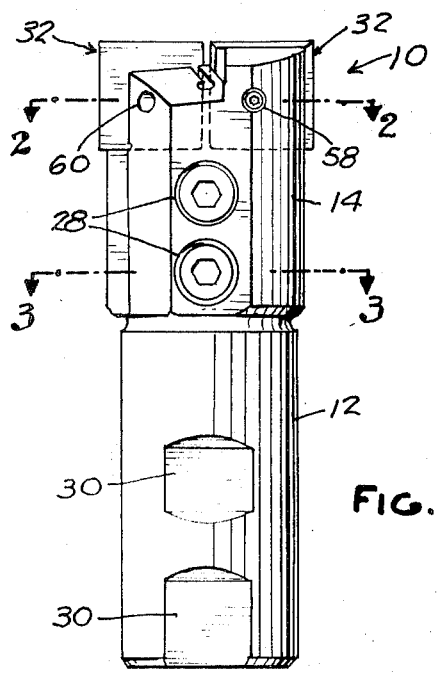
FIG. 1 is an elevational view of a tool holder constructed in accordance with the present invention.
Figure 2:
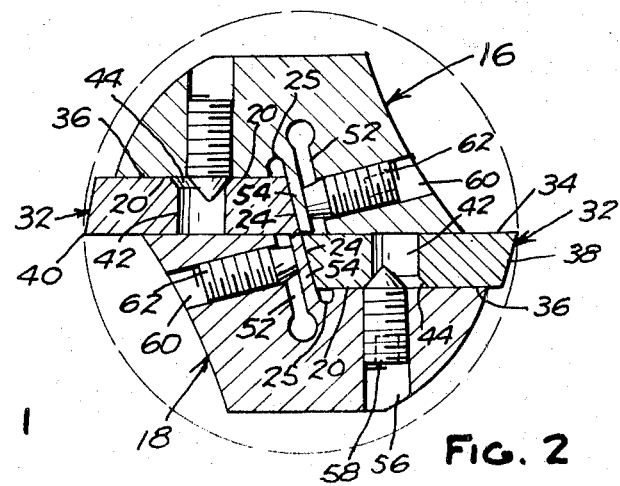
FIG. 2 is a sectional view taken along the line 2—2 in FIG. 1.
Figure 4:
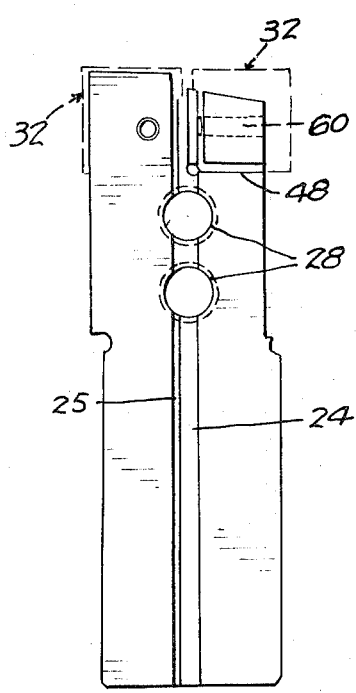
FIG. 4 is an elevational view of one half section of the holder as viewed along the line 4—4 in FIG. 3.
Figure 5:
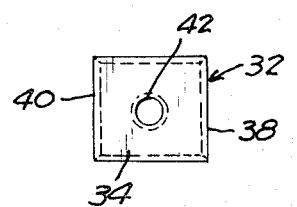
FIG. 5 is a plan view of an indexable insert adapted to be mounted in the holder illustrated.

The indexable cutting inserts adapted to be mounted on the holder are shown best in FIGS. 2 and 5. Each insert, generally designated 32, is shaped as a regular polygon and has opposed parallel side faces 34,36 and anvil-shaped end faces 38 which intersect with side faces 34 to form a plurality of cutting edges 40 around the periphery of the insert. Each insert 32 is formed with a centrally disposed opening 42 chamfered as at 44 at side face 36.

Each half section 16,18 has a recess 46 formed in the parting side face 36 of its head portion 14. Each recess 46 is open at the radially inner and outer ends thereof and at the axially upper end thereof. Each recess 46 is formed as a radially extending slot in face 22 and has a bottom wall 48 inclined to correspond with the inclined anvil-shaped end faces 38 of the insert and a flat, axially extending inner face 50 against which flat side face 34 of the insert is adapted to be positioned in coplanar relation. A somewhat radially extending slot 52 is formed in face 50 of each recess 46. Each slot 52 is disposed adjacent, but spaced from, the parting face 24 and is parallel to the latter so as to form one each half section a radially flexible blade 54. As shown in FIGS. 2 and 3, the parting faces 24 are inclined to the parting faces 22 and 20 to correspond with the inclination of the anvil-shaped faces 38 of the inserts relative to the faces 34,36. Thus, when the two half sections 16, 18 are assembled recesses 46 define two generally diametrically opposed pockets for the reception of inserts 32. The opposite side faces of the pockets are defined by the flat faces 20 and the recessed flat faces 50. The radially inner end face of each pocket is defined by the portion of parting face 24 adjacent slot 52. Stated differently, when the two half sections are assembled, blade 54 on section 16 forms a flexible end wall for recess 46 on section 18 and blade 54 on section 18 forms a flexible end wall for recess 46 on section 16.

Each section 16,18 is formed with a threaded opening 56 which extends from the outer surface of the head 14 inwardly through parting face 20. The axis of each threaded opening 56 is perpendicular to parting face 20 and is located with respect to each recess 46 so as to be offset slightly in a radially inward direction from the axis of the opening 42 of the insert seated in the recess. A cone point screw 58 is engaged in each threaded opening 56. Each half section 16,18 is also provided with a second threaded opening 60, the axis of which is perpendicular to the plane of blade 54. Each threaded opening 60 opens at its inner end through slot 52 so that, when a threaded set screw 62 in each opening 60 is advanced inwardly, its axially inner end is adapted to abut against the face of blade 54 defined by slot 52.

The inner face 50 of each recess 46 is slightly inclined in a vertical direction so that the pocket formed thereby is slightly narrower at its upper end than the thickness of an insert 32. Thus, when the two half sections 16,18 are clamped together with their parting faces in coplanar engagement the inserts are frictionally clamped in their respective pockets between faces 20 and 50.

In use, after the inserts are seated in their respective pockets and the two half sections clamped together the screws 58,62 can be adjusted so that each of the cutting edges 40 are spaced radially from the axis of rotation of the tool holder exactly the same amount and at the desired radial distance. If either or both of the inserts extend outwardly a distance greater than desired, screws 62 are backed off and screws 58 are advanced so that the cone point end of screws 58 engage the chamfer 44 of the inserts to retract the inserts radially. Thereafter the screws 62 can be tightened so that each insert is firmly clamped in its radially adjusted position in its respective pocket on the holder. Radial inward displacement of each insert is accommodated by the flexing of blades 54 in a radially inward direction. On the other hand, if it is desired to displace either or both of the inserts radially outwardly, screws 58 are backed off and screws 62 are advanced to flex blades 54 in a radially outward direction and correspondingly displace the inserts. Since screws 62 are located in a vertical plane generally midway between the upper and lower ends of the pockets in which the inserts are seated and since blades 54 extend the full height of the pocket, it follows that as blades 54 flex either inwardly or outwardly they maintain at least line contact with the radially inner anvil edge of the inserts substantially throughout the length thereof. This eliminates any tendency for the inserts to rock or rotate about the axes of slots 52 during the cutting operation.

It will be appreciated that the construction of the holder lends itself for economical manufacture. Blades 54 are easily and inexpensively formed by slotting each half section from the upper end thereof downwardly to the upper opening 28. The inner ends of these slots are drilled as shown to eliminate stress concentration points. Likewise, it will be observed that face 50 of each recess 46 can be formed by a simple milling and/or grinding operation since these faces are generally parallel to and spaced radially from the parting face 20 of the respective half section. This design of the recesses 46 and slots 52 results in the construction of each half section by relatively simple machining operations. The manufacture of the tool holder is also rendered economical by the fact that each insert can be individually adjusted to a desired precise radial location. This eliminates the extremely close tolerances that would otherwise be required in the machining of both the holder and the insert.

I claim:

1. A tool holder for indexable cutting inserts comprising, a body having a shank at one end and a head at its opposite end, said body being split lengthwise into two half sections, means for retaining the half sections in an assembled face-to-face relation, said head in the assembled condition of said half sections being adapted to retain a cutting insert of the type having two opposed generally parallel flat faces connected around the periphery thereof by a plurality of anvil edge faces, each provided with a cutting edge, said inserts being symmetrical about a central axis perpendicular to said flat faces and having an opening therethrough concentric with said axis, at least one of said half sections having a recess in the parting face thereof cooperating with the parting face of the other half section to define a pocket for the reception of said insert, said insert being clamped in said pocket by said two half sections when the latter are assembled in face-to-face relation, said pocket having an axially extending radially inner wall which is inclined to correspond generally with the inclination of said anvil faces relative to the flat side faces of the insert, said radially inner wall of said pocket extending axially substantially the full length of the pocket and being radially flexible, said pocket being open at one side of said head to enable one anvil edge face of the insert to project radially outwardly of the head when an opposed anvil edge face of the insert is disposed in abutting relation with said flexible inner wall, a first insert adjusting means on one half section aligned radially with said flexible wall and disposed on the side thereof radially opposite the pocket defined by said end wall, said adjusting means being adapted to flex said wall radially outwardly of the pocket in response to radial inward movement of said adjusting means to thereby displace the insert in the pocket in a radially outward direction, and second insert adjusting means on one of said half sections engageable with the opening in the insert to displace the insert radially inwardly and thereby flex said wall into firm abutting engagement with the first insert adjusting means.

2. A tool holder as called for in claim 1 wherein said flexible wall comprises a blade integrally connected with its respective half section substantially throughout the axial extent of said pocket, said connection providing an axis about which the blade flexes.

3. A tool holder as called for in claim 1 wherein one of said half sections has an axially extending slot therein spaced radially from the radially inner end of said pocket, said slot having a depth at least slightly greater than the depth of said pocket, the portion of said half section between the pocket and the slot defining said flexible wall.

4. A tool holder as called for in claim 1 wherein said flexible wall comprises an axially extending blade at the radially inner end of said pocket integrally connected to its respective half section in a direction lengthwise along one edge of the blade, said connected edge forming an axis generally parallel to the axis of the shank and about which the blade is adapted to flex.

5. A tool holder as called for in claim 4 wherein said first insert adjusting means comprises a screw threaded into the half section to which the blade is connected and adapted to bear against the face of the blade opposite said pocket.

6. A tool holder as called for in claim 5 wherein the second insert adjusting means comprises a screw threaded into one of said half sections along an axis offset slightly in a radially inward direction from the through hole in the insert and adapted to cam the insert radially inwardly when the last-mentioned screw is advanced by interengagement with the edge of said through opening.

7. A tool holder as called for in claim 1 wherein said two half sections are of substantially identical shape, each including a similar recess and a flexible radially inner wall of the type described whereby to provide two such pockets in the holder, said pockets extending radially outwardly on opposite sides of a diameter extending through said parting surface.

8. A tool holder as called for in claim 7 wherein the parting surface of each half section comprises two generally flat, axially extending, parallel faces which are radially offset from one another and interconnected by an axially extending shoulder which is inclined to the planes of said flat faces to correspond generally with the inclination of the anvil end faces of said inserts relative to the flat side faces thereof.

9. A tool holder as called for in claim 8 wherein each of said recesses is formed on a corresponding face of each half section and extends inwardly on said face to a diametrical plane parallel to said flat face.

10. A tool holder as called for in claim 9 wherein the radially inner end wall for each pocket is formed integrally with the half section opposite that in which the recess is formed.

11. A tool holder as called for in claim 10 wherein the flexible wall on each half section is defined by an axially extending slot generally parallel to said inclined shoulder.

12. A tool holder as called for in claim 11 wherein said first and second insert adjusting means comprise two screws on each half section, one of said two screws being engageable with the through opening in the insert to displace the blade and flex said end wall radially inwardly and the other screw being positioned to extend transversely through said slot and flex the wall and displace the insert in a radially outward direction.

* * * * *